(12) United States Patent
Kakimi et al.

(10) Patent No.: US 8,468,976 B2
(45) Date of Patent: Jun. 25, 2013

(54) POULTRY RAISING SYSTEM, POULTRY RAISING METHOD AND LUMINESCENT DEVICE FOR RAISING POULTRY

(75) Inventors: Satoshi Kakimi, Osaka (JP); Noriaki Yamazaki, Yachiyo (JP); Naoki Kakimi, Hiroshima (JP); Yozo Fukugawa, Bunkyo-ku (JP)

(73) Assignee: Sharp Kabushiki Kaisha, Osaka (JP)

( * ) Notice: Subject to any disclaimer, the term of this patent is extended or adjusted under 35 U.S.C. 154(b) by 250 days.

(21) Appl. No.: 12/864,111

(22) PCT Filed: Jan. 13, 2009

(86) PCT No.: PCT/JP2009/050274
§ 371 (c)(1),
(2), (4) Date: Jul. 22, 2010

(87) PCT Pub. No.: WO2009/093493
PCT Pub. Date: Jul. 30, 2009

(65) Prior Publication Data
US 2010/0294205 A1 Nov. 25, 2010

(30) Foreign Application Priority Data
Jan. 22, 2008 (JP) .................. 2008-011502

(51) Int. Cl.
*A01K 31/00* (2006.01)
(52) U.S. Cl.
USPC ........................... 119/437; 119/174; 119/531
(58) Field of Classification Search
USPC ............... 119/437, 174, 531, 537, 6.8
See application file for complete search history.

(56) References Cited

U.S. PATENT DOCUMENTS 4,625,728 A * 12/1986 Schonberg .................... 119/6.8
4,765,337 A * 8/1988 Schonberg ..................... 607/88
(Continued)

FOREIGN PATENT DOCUMENTS

JP 5-199823 A 8/1993
JP 10-208537 8/1998
(Continued)

OTHER PUBLICATIONS

International Search Report for PCT/JP2008/050274, mailed Feb. 24, 2009.

(Continued)

*Primary Examiner* — Yvonne Abbott
(74) *Attorney, Agent, or Firm* — Nixon & Vanderhye P.C.

(57) ABSTRACT

A poultry raising system includes a poultry house and facilities attached to the poultry house. The facilities include lighting facilities irradiating poultry with light; and the lighting facilities include a semiconductor light source, for irradiation with light having peak wavelength in the range of 550 to 650 nm emitted from the semiconductor light source. The light in this wavelength range has positive influence on sexual maturation, appetite, need for sleep and condition of internal organs. Light of shorter peak wavelength includes ultraviolet rays that cause stress on the poultry and attract insects. Light of longer wavelength includes infrared rays that increase temperature of the poultry and of the poultry house. It is possible to emit light having peak wavelength in a specific range effective to growth and fattening. Because of high electricity-to-light conversion efficiency, high economic efficiency can be attained, and $CO_2$ emission can be reduced. Risk of shattering of a globe by abrupt cooling can be reduced, and temperature increase in the poultry house can be prevented. Longer life reduces danger, labor and cost of exchange. Thus, meat and egg yield can be increased and economical efficiency can be improved.

19 Claims, 6 Drawing Sheets

U.S. PATENT DOCUMENTS

| | | | |
|---|---|---|---|
| 6,639,665 B2 * | 10/2003 | Poole | 356/300 |
| 2002/0135760 A1 * | 9/2002 | Poole | 356/300 |
| 2003/0160182 A1 * | 8/2003 | Petrich et al. | 250/458.1 |
| 2005/0276720 A1 * | 12/2005 | Correa | 422/24 |
| 2010/0105309 A1 * | 4/2010 | Ishibashi | 454/187 |

FOREIGN PATENT DOCUMENTS

| | | |
|---|---|---|
| JP | 2002-199816 | 7/2002 |
| JP | 2007-059260 | 3/2007 |
| JP | 2007-122950 | 5/2007 |
| JP | 2007-165016 | 6/2007 |

OTHER PUBLICATIONS

Horino, Y. et al., "Hakko Diode no Yokei Bun' ya eno Oyo (1)", Reports of Nara Livestock Technology Center, No. 32, (2006), pp. 35-40, with partial translation.

Sasaki, K. et al., "Sanrankei no Windowless Keisha ni Okeru Kanketsu Shomeika Teishodo no Eikyo", Mie-Ken Nogyo Gijutsu Center Kenkyu Hokoku, No. 25, (1997), pp. 47-53, with partial translation.

Yan et al, "Lighting Control Circuit for Scientifically Raising Chickens", Dept. of Mechanics & Electrics, Changchun University, 1992, second stage, p. 45 (w/English translation).

"Light and Electromagnetic Waves," Maruzen Co., Ltd., Chronological Scientific, 2006, pp. 1-3 with Partial English Translation.

"Bulletin of the Okayama Prefectural Poultry Experiment Station," The Okayama Prefectural Poultry Experiment Station, No. 28, 1986, pp. 1-9 with Partial English Translation.

"Bulletin of the Hyogo Prefectural Agricultural Institute (Animal Husbandry Section No. 36)," The Hyogo Prefectural Agricultural Institute, No. 36, pp. 1-6 with Partial English Translation, 2000.

"Shin Kenchikugaku Taikei 10," Environmental Physics, Shokokusha Publishing Co., Ltd., Aug. 1984, pp. 1-7 with Partial English Translation.

"Data Bukku of Shoumei," Ohmsha, Ltd., Nov. 1953, pp. 1-5 with Partial English Translation.

International Search Report for PCT/JP2009/050274, mailed Feb. 24, 2009.

Office Action mailed in Chinese Application No. 200980102818.1, with English Translation (10 pages).

Erdemtu et al., "Effect of Monochromatic Light on the Albumen Height, Haugh Unit and Egg Color," China Poultry, vol. 28, No. 21, 2006, pp. 11-13, which includes an English abstract.

* cited by examiner

POULTRY RAISING SYSTEM, POULTRY RAISING METHOD AND LUMINESCENT DEVICE FOR RAISING POULTRY

This application is the U.S. national phase of International Application No. PCT/JP2009/050274 filed 13 Jan. 2009, which designated the U.S. and claims priority to Japan Application No. 2008-011502 filed 22 Jan. 2008, the entire contents of each of which are hereby incorporated by reference.

TECHNICAL FIELD

The technology presented herein relates to a poultry raising system, a poultry raising method and a luminescent device for poultry raising. More specifically, the present technology relates to a poultry raising system, a poultry raising method and a luminescent device for raising poultry, suitable for raising poultry.

BACKGROUND AND SUMMARY

Livestock includes hogs and poultry such as chickens. Hatching, breeding and raising of such livestock take place throughout the year in an open livestock building, a semi-windowless livestock building or in a windowless livestock building. In order to attain high yield through artificial rearing, rearing population must be large. Therefore, rearing locations tend to be in a cold district or in mountain areas. Further, since raring facilities of large area and odor management of livestock excreta are required, rearing facilities having fully closed structure are often used.

It has been known that exposure to light has an influence on animal reproductive function, and the degree of influence differs depending on the types of livestock animals. The difference in degree of influence is considered to be derived from physiological property and development during the evolution process of photoreceptors.

FIG. 6 is a schematic illustration showing a conventional example of the method of rearing chicks using light bulbs. Referring to FIG. 6, the method is for rearing poultry chicks in a wide rearing house 100, characterized in that the rearing house is kept dark and the floor is illuminated with a light source or sources to maintain lighted portions of a prescribed diameter in accordance with the number of chicks, and that the diameter of each lighted portion is gradually made larger as the raised chicks grow.

Specifically, on the ceiling of rearing house 100, light bulbs 200 (here, incandescent bulbs of 100 W) and auxiliary light bulbs 400 are arranged to be turned on through a SLIDAC (not shown). Each light bulb 200 has a conical shade 300 that can be opened/closed, and by adjusting the opening of shade 300, the diameter of a lighted portion 700 on the floor irradiated with the light bulb can be changed.

Patent Document 1: Japanese Patent Laying-Open No. 05-199823

Appropriate control of the amount of light to which the livestock is exposed is one important factor that influences the growth of livestock. No matter whether the artificial rearing installation uses artificial light only or uses combination of artificial and natural light, a light source is indispensable in the artificial rearing installation. Particularly in the case of poultry, sexual maturation depends on day length and, therefore, somatic growth and ovulation are industrially controlled using light illumination, contributing to stable supply of meat and egg productions.

In conventional artificial rearing installations, however, incandescent lamps, fluorescent lamps or halogen lamps are used as light sources, which require much energy and involve high cost of electric power. Further, since incandescent lamps have short life, considerable cost and labor are required for exchanging bulbs.

In addition, light emitted from such light sources include infrared rays that unnecessarily increase the temperature in the livestock building. If water used for cleaning the livestock building should splatter on a hot light bulb, the glass shatters and flies. Since the bulbs have short life and must be exchanged frequently, there is high risk that the glass shatters and flies at the time of exchange.

Therefore, in the field of artificial rearing, there is a demand for higher safety and economic efficiency.

The technology presented herein was made to solve the above-described problems and its object is to provide a poultry raising system, poultry raising method and luminescent device for raising poultry that can increase meat and egg yield.

Another object of the present technology is to provide a poultry raising system, poultry raising method and luminescent device for raising poultry that can improve safety and economic efficiency.

Through intensive study to attain the objects described above, the inventors have found that irradiation of poultry including chicken with light of specific wavelength using a luminescent device including a semiconductor light source such as an LED (Light Emitting Diode) lamp for illumination having the shape of a light bulb is effective in increasing meat and egg yield. Further, they have also found that the light-bulb-shaped LED lamp for illumination also attains superior safety and economic efficiency. The present technology is made based on such findings.

In order to attain the above-described features, according to an aspect, the example embodiments presented herein provides a poultry raising system including a poultry house and facilities attached to the poultry house, wherein the facilities include lighting facilities for irradiating poultry with light; and the lighting facilities include a semiconductor light source, for irradiation with light having peak wavelength in the range of 550 to 650 nm emitted from the semiconductor light source.

According to the present embodiment, by the poultry raising system, the poultry is irradiated with light having peak wavelength in the range of 550 to 650 nm.

The wavelength range of 550 to 650 nm is suitable since it has good influence on sexual maturation of poultry. The light in this wavelength range stimulates the hypothalamic area through visual perception, and has positive influence on the instinctive need to eat food and to sleep and on hormone secretion to attain good condition of internal organs. Therefore, it is preferred that the light for irradiation is in this wavelength range.

If the light emitted from the semiconductor light source has a peak wavelength shorter than 550 nm, it means that the light includes ultraviolet rays that cause stress on the poultry and have bad influence on meat and egg production. Further, it leads to pest infection harmful to poultry. If the light emitted from the semiconductor light source has a peak wavelength longer than 650 nm, it means that the light includes infrared rays that unnecessarily increase the temperature in the poultry house, causing heat stress on the poultry trying to avoid increase of body temperature.

Therefore, the light emitted from the semiconductor light source should preferably have the peak wavelength in the range of 550 to 650 nm and more preferably in the range of 580 to 620 nm. More preferable range is 590 to 610 nm. The light in such wavelength range exhibits the color of incandescent lamp, which promotes growth and fattening of livestock.

Use of a semiconductor light source enables emission of only the light having the peak wavelength in the specific range mentioned above. As a result, poultry is exposed to light having the wavelength effective in growth and fattening of the poultry, so that meat and egg yield can be increased. Further, a semiconductor light source has high conversion efficiency from electricity to light. Therefore, when a semiconductor light source is used as a light source, power cost can be reduced, attaining high economic efficiency. Further, since the power consumption can be reduced, amount of $CO_2$ emission can be reduced.

Further, a semiconductor light source hardly generates heat. Therefore, it is possible to reduce the risk that a glass globe covering the semiconductor light source is shattered as it is cooled abruptly. Further, increase of the poultry house temperature caused by the light from the light source can be prevented. In addition, since a semiconductor light source has long life, the number of exchanging the light source can be reduced, and hence the danger, cost and labor of exchanging can be reduced. A semiconductor light source can be used at an electric field level not causing dielectric breakdown in high-moisture environment even if it is used with a common driving circuit and a common current lead-in wire, and hence, possibility of electric leakage is low.

As a result, a poultry raising system that can improve meat and egg yield can be provided. Further, a poultry raising system that can improve safety and economical efficiency can be provided.

Preferably, the light emitted from the lighting facilities attains illuminance of 1 to 30 lx at the eye level of the poultry.

In the poultry raising system in accordance with the present embodiment, the poultry is irradiated with the light having the illuminance of 1 to 30 lx at the eye level of the poultry.

If the illuminance is lower than 1 lx at the eye level of the poultry, it is dark and the poultry becomes less active and comes to eat less. This has bad influence on somatic growth. Further, it is too dark for people to work. If the illuminance is higher than 30 lx at the eye level of the poultry, the poultry becomes too active. Though they eat food, it does not lead to notable somatic growth, resulting in undesirable feed requirement.

When the poultry is exposed to the light of 1 to 30 lx, appropriate activity of poultry can be attained, feed requirement can be improved and notable somatic growth can be attained.

Preferably, the lighting facilities further include an illuminance adjusting mechanism capable of continuous or stepwise adjustment of illuminance of emitted light, from the highest illuminance in the range of 1 to 30 lx at the eye level of the poultry to illuminance at the time of power off.

According to the present embodiment, the poultry is exposed to light with the illuminance adjusted stepwise or continuously from the highest to turn-off. Therefore, different from when illuminance is switched instantaneously, birds do not rush to feeders of food and water. The birds try to eat much food before it gets dark and, therefore, it is possible to urge the poultry to eat large amount of food. Further, by exposing the poultry to the light of 1 to 30 lx, appropriate activity of poultry can be attained, feed requirement can be improved and notable somatic growth can be attained.

Preferably, the lighting facilities further include a height adjusting mechanism capable of adjusting height of the semiconductor light source such that emitted light attains illuminance in the range of 1 to 30 lx at the eye level of the poultry.

According to the present embodiment, the height of semiconductor light source can be adjusted such that the illuminance of 1 to 30 lx is attained at the eye level of the poultry. Therefore, even when the light source is changed to a semiconductor light source of a different type or of different output, the illuminance can be adjusted to be 1 to 30 lx at the eye level of the poultry. By exposing the poultry to the light of 1 to 30 lx, appropriate activity of poultry can be attained, feed requirement can be improved and notable somatic growth can be attained.

More preferably, the lighting facilities further include a swing reducing mechanism for reducing swing of the semiconductor light source.

According to the embodiment, swing of the semiconductor light source can be reduced. Therefore, fluctuation of illuminance at the eye level of the poultry can be reduced.

More preferably, the height adjusting mechanism is a fixing rope suspending the semiconductor light source from an anchor point where the semiconductor light source is mounted on the poultry house, allowing adjustment of length between the semiconductor light source and the anchor point; and the swing reducing mechanism is an auxiliary rope capable of limiting amplitude of pendulum motion of the semiconductor light source suspended from the anchor point.

According to the present embodiment, the height of semiconductor light source can be adjusted and the swing of semiconductor light source can be reduced, with a simple structure at low cost.

Preferably, the light emitted from the lighting facilities is in a color temperature range of incandescent lamp color.

By the poultry raising system in accordance with the present embodiment, the poultry is exposed to light in the color temperature range of incandescent lamp. Specifically, the color temperature range of incandescent lamp is 2500 to 4000K. This promotes growth and fattening of poultry.

Preferably, the light emitted from the lighting facilities is in a chromaticity coordinate range of incandescent lamp color.

By the poultry raising system in accordance with the present embodiment, the poultry is exposed to light in the chromaticity coordinate range of incandescent lamp. Specifically, the range of chromaticity coordinates corresponding to the incandescent lamp is a range in a rectangle having four points of (x, y)=(0.421, 0.377), (0.457, 0.386), (0.490, 0.442) and (0.447, 0.431) as vertexes. This range promotes growth and fattening of poultry.

Preferably, the poultry house is a windowless poultry house. The windowless poultry house has no window.

According to the embodiment, external light to the poultry house is shielded. Therefore, only the light from the semiconductor light source has the influence on the poultry. As a result, undesirable influence of external light can be avoided.

Preferably, the semiconductor light source includes a light emitting diode or a laser diode.

Preferably, the semiconductor light source is a light-bulb-shaped LED lamp for illumination. By using the light-bulb-shaped LED lamps for illumination, it becomes easier to design lighting of a large area with uniform brightness.

According to another aspect, the present embodiment provides a method of raising poultry in a poultry raising system including a poultry house and facilities attached to the poultry house, wherein lighting facilities included in the attached facilities for irradiating poultry with light include a semiconductor light source emitting light having peak wavelength in the range of 550 to 650 nm.

By the present embodiment, a method of raising poultry that can increase meat and egg yield can be provided. Further, a method of raising poultry that can improve safety and economic efficiency can be provided.

According to a further aspect, the present embodiment provides a luminescent device for raising poultry, comprising a semiconductor light source having peak wavelength in a range of 550 to 650 nm.

According to the present embodiment, a luminescent device for poultry raising that can increase meat and egg yield can be provided. Further, a luminescent device for poultry raising that can improve safety and economic efficiency can be provided.

As described above, according to the present embodiment, a poultry raising system, poultry raising method and luminescent device for raising poultry that can increase meat and egg yield can be provided. Further, a poultry raising system, poultry raising method and luminescent device for raising poultry that can improve safety and economic efficiency can be provided.

DESCRIPTION OF THE REFERENCE SIGNS

Figure 1:
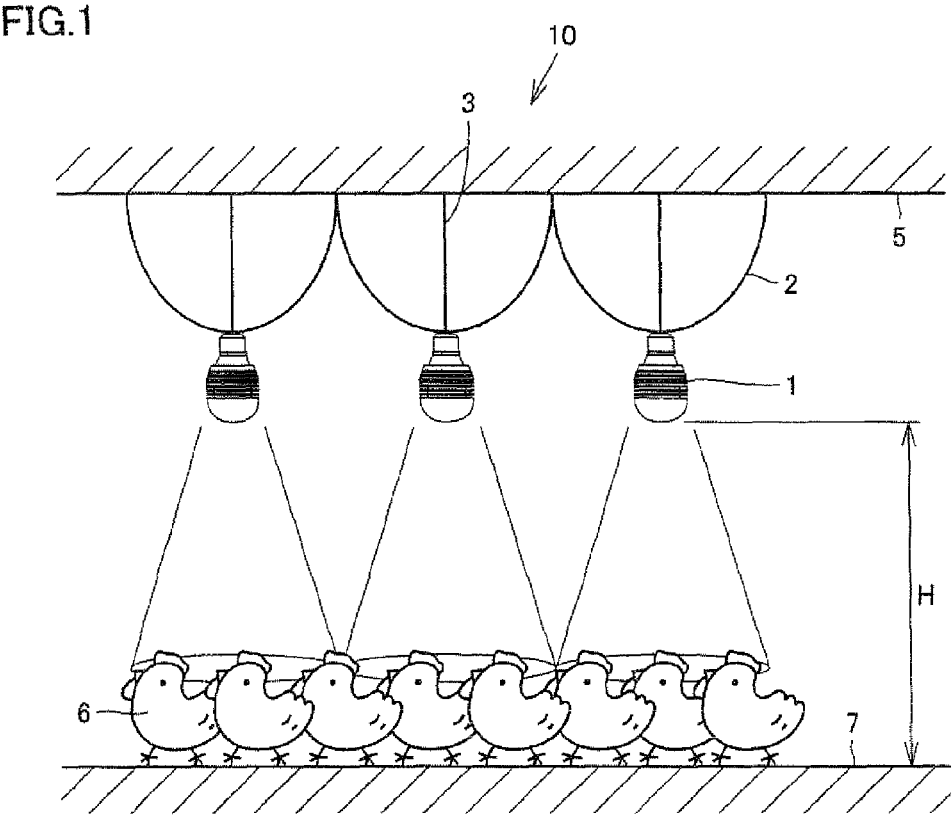
FIG. 1 is a schematic illustration showing a poultry house in accordance with an embodiment.

1 light-bulb-shaped LED lamp for illumination, 2 auxiliary rope, 3 fixing rope, 4 dimmer control filter, 5 beam, 6 chicken, 7 floor, 10 poultry house, 11 flat-type, light-bulb-shaped LED lamp for illumination, 12 reflection film.

BEST MODES

In the following, embodiments will be described in detail with reference to the figures. In the following description, the same or corresponding portions are denoted by the same reference characters and they have the same names and functions. Therefore, detailed description thereof will not be repeated.

In the embodiments, description will be made on chickens as representative of poultry. The application of the embodiment, however, is not limited thereto. The present embodiments are also applicable to other poultry including quails, ducks, geese, turkeys, dabblers or ostriches that have mediobasal hypothalamus (MBH) as a core of photoperiodicity similar to that of chickens, in relation to the exposure to light of specific light as a characteristic point of the present embodiment.

FIG. 1 is a schematic illustration showing a poultry house 10 in accordance with an embodiment. Referring to FIG. 1, poultry house 10 includes a building and attached facilities. The building of the poultry house here has a windowless structure without any window through which external light enters. It is preferred that in the windowless type poultry house 10, the illuminance in poultry house 10 is lower than 0.4 lx when light-bulb-shaped LED lamps 1 for illumination are off.

The building structure of poultry house is not limited to the windowless type provided that it is covered by the roof and walls to shield sunlight. It may be an open type having a window allowing entrance of external light, or a semi-windowless type in which a black-out curtain or curtains are put on the window.

The facilities attached to the poultry house include: lighting facilities for emitting light to chickens and for workers; air conditioning facilities for adjusting temperature and moisture in the poultry house; cage/floor system providing a space for rearing chickens; feeding/watering facilities providing food and water for chickens; egg collection facilities for collecting laid eggs; and manure management facilities for managing poultry manure.

As regards the cage/floor system, in the present embodiment, cage-free floor system is used. It is not limiting, however, and other cage system or cage-free system, including low/middle/high floor terraced cage rows, vertical cage rows or two-tier floor system may be used.

In the present embodiment, light-bulb-shaped LED lamps 1 for illumination are suspended from a beam 5 of the building. Therefore, from the viewpoint that nothing blocks the light from light-bulb-shaped LED lamps 1, the cage-free floor system is most suitable to make use of the characteristics of the invention.

Even when other cage system or floor system including objects blocking the light from above is adopted, similar effects can be attained if chickens can be directly exposed to the light from light-bulb-shaped LED lamps 1 by devising ways of illumination, for example, by emitting light from the side.

The lighting facilities include light-bulb-shaped LED lamp 1 as the semiconductor light source, a fixing rope 3, an auxiliary rope 2, a controller for timer-controlling turn-on and turn-off of light-bulb-shaped LED lamp 1, and a power line connecting light-bulb-shaped LED lamp 1 and the controller.

Fixing rope 3 is for suspending light-bulb-shaped LED lamp 1 from an anchor point on beam 5 of the building, with its length from light-bulb-shaped LED lamp 1 to the anchor point adjustable. As such, the rope allows adjustment of the illuminance of light-bulb-shaped LED lamp 1 at the eye level of the chickens to a prescribed value. The height of light-bulb-shaped LED lamp 1 is adjusted, for example, to be 170 cm vertically above a floor surface 7.

Here, the prescribed value at the eye level of chickens is any value in the range of 1 to 30 lx. If the illuminance is lower than 1 lx at the eye level of chickens, it is dark and chickens become less active and come to eat less. This has bad influence on somatic growth. Further, it is too dark for people to work. If the illuminance is higher than 30 lx at the eye level of chickens, they become too active. Though they eat food, it does not lead to notable somatic growth, resulting in undesirable feed requirement.

When chickens are exposed to the light of 1 to 30 lx, appropriate activity of chickens can be attained, feed requirement can be improved and notable somatic growth can be attained.

Further, the height of light-bulb-shaped LED lamp 1 for illumination can be adjusted such that the illuminance of 1 to 30 lx is attained at the eye level of chickens. Therefore, even when the lamp is changed to one of a different type or of different output, the illuminance can be adjusted to be 1 to 30 lx at the eye level of chickens.

The mechanism that adjusts the position of light-bulb-shaped LED lamp 1 for illumination is not limited to rope 3, and any mechanism such as a covered power line, a wire, a chain, a link mechanism or an expansion/contraction mechanism may be used, provided that it can adjust the position of light-bulb-shaped LED lamp 1 for illumination to attain the illuminance of a prescribed value at the eye level of chickens.

Auxiliary rope 2 limits the amplitude of pendulum motion of light-bulb-shaped LED lamp 1 for illumination suspended from the anchor point, and thereby reduces swings of light-bulb-shaped LED lamp 1 for illumination. Two auxiliary ropes 2 are connected slack, with one end of each rope connected close to a connection between fixing rope 3 and the bulb socket and the other end connected to beam 5 at positions on opposite sides of the anchor point of fixing rope 3 on beam 5.

Since auxiliary ropes 2 are attached in this manner, if light-bulb-shaped LED lamp 1 for illumination swings in a direction, the amplitude is limited to the distance at which auxiliary rope on the side opposite to the swinging direction is fully stretched. Specifically, by adjusting the degree of slack, swing of light-bulb-shaped LED lamp 1 for illumination can be controlled.

Though two auxiliary ropes 2 are provided for one fixing rope 3, three or more ropes may be provided.

Further, provision of auxiliary rope 2 is not limiting, and other measures for reducing swing of light-bulb-shaped LED lamp 1 for illumination may be adopted. By way of example, the link mechanism or expansion/contraction mechanism mentioned above allows position adjustment and, in addition, reduces swing.

Alternatively, light-bulb-shaped LED lamp 1 for illumination may be suspended using only the two auxiliary ropes 2 without using fixing rope 3, and the height of light-bulb-shaped LED lamp 1 for illumination may be adjusted by auxiliary ropes 2.

Though fixing rope 3 and auxiliary ropes 2 are attached to beam 5, the ropes may be attached to other portions such as the ceiling, post, or other structural member of the building that allows attachment of height adjusting mechanism and swing reducing mechanism for light-bulb-shaped LED lamp 1 for illumination.

In the present embodiment, light-bulb-shaped LED lamp 1 for illumination as a semiconductor light source is attached to the building using fixing rope 3 as the height adjustment mechanism and auxiliary ropes 2 as the swing reducing mechanism. The manner of attachment is not limited to the above. For example, the semiconductor light source may be directly attached to the beam, ceiling post or other structural member of the building. In that case also, similar effects as when the height adjustment mechanism and the swing reducing mechanism are used can be attained.

Figure 2A:
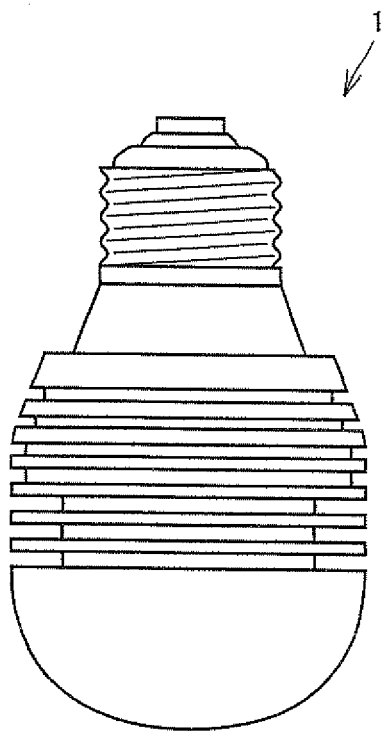
FIG. 2A shows an appearance of a light-bulb-shaped LED lamp for illumination, installed in the poultry house in accordance with the embodiment.
Figure 2B:
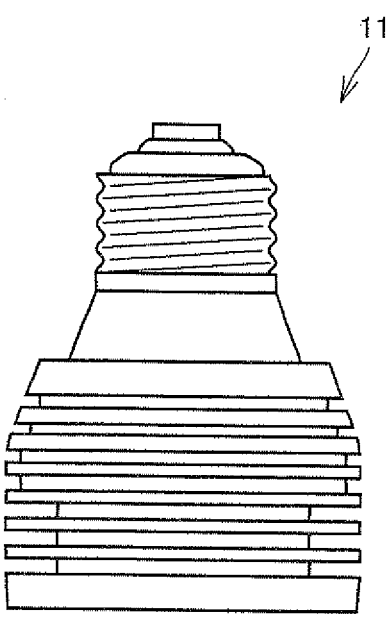
FIG. 2B shows an appearance of a flat-type, light-bulb-shaped LED lamp for illumination.

FIG. 2A shows light-bulb-shaped LED lamp 1 for illumination provided in the poultry house in accordance with the present embodiment, and FIG. 2B shows an appearance of a flat-type light-bulb-shaped LED lamp 11 for illumination. Referring to FIG. 2A, as regards the appearance, light-bulb-shaped LED lamp 1 for illumination includes an E26 cap similar to that of an ordinary incandescent lamp, a semi-spherical glass globe having the similar shape as a top portion of the globe of a common ball-shaped incandescent lamp, and a heat radiation fin provided between the cap and the cover. Here, the diameter at the radiation fin portion is 5 cm.

The shape of light-bulb-shaped LED lamp 1 for illumination as the semiconductor light source is not limited to the above, and it may have a flat shape, a spot-light shape, or a reflector shape. Similar effects can be attained even if the semiconductor light source has a shape different from the light-bulb shape.

Referring to FIG. 2B, in a flat-type light-bulb-shaped LED lamp 11 for illumination as one modification, the cap and the radiating fin portion are of the same shape as those of light-bulb-shaped LED lamp 1 for illumination. Different from light-bulb-shaped LED lamp 1, flat-type light-bulb-shaped LED lamp 11 for illumination has not a semi-spherical but a flat-shaped globe.

Inside the light-bulb-shaped LED lamp 1 for illumination, 36 LED chips of incandescent lamp color and a power supply circuit are provided. Here, light-bulb-shaped LED lamp 1 for illumination has vertical illuminance comparable to that of a 40 W incandescent lamp. The input voltage corresponds to AC 100V. Further, since E26 cap is adopted, it can readily replace an incandescent lamp. Therefore, it is unnecessary to remodel the lighting facilities of the poultry house to use light-bulb-shaped LED lamp 1 for illumination, and hence, initial cost of introduction is low.

The number of LED chips included in one light-bulb-shaped LED lamp 1 for illumination is not limited to 36, and it may be one or more.

The LED chip of incandescent lamp color emits light having peak wavelength in the range of 550 to 650 nm. Further, the light emitted from light-bulb-shaped LED lamp 1 for illumination hardly includes ultraviolet ray or infrared ray.

The wavelength range of 550 to 650 nm has good influence on sexual maturation of chickens. The light in this wavelength range stimulates the hypothalamic area through visual perception, and has positive influence on the instinctive need to eat food and to sleep and on hormone secretion to attain good condition of internal organs.

If the light emitted from the semiconductor light source has a peak wavelength shorter than 550 nm, it means that the light includes ultraviolet rays that cause stress on chickens and have bad influence on meat and egg production. Further, it leads to pest infection harmful to chickens. If the light emitted from the semiconductor light source has a peak wavelength longer than 650 nm, it means that the light includes infrared rays that unnecessarily increase the temperature in the poultry house, causing heat stress on chickens trying to avoid increase of body temperature.

The light emitted from light-bulb-shaped LED lamp 1 for illumination hardly includes light having the wavelength shorter than 430 nm that attracts insects. By way of example, Leucocytozoonosis is known to be caused by protozoa called Leucocytozoon cauleryi, transmitted by very small hematophagous insect (pest) called culicoides arakawae.

The light emitted from light-bulb-shaped LED lamp 1 for illumination hardly includes light having the wavelength in the range that attracts insects. Therefore, it has insect repellent effect, and avoids diseases of poultry transmitted by insects.

It may be possible to confirm, by experiments, the limit amount of light having the wavelength shorter than 430 nm that attracts insects, to ensure the insect repellent effect, and to use light-bulb-shaped LED lamp 1 for illumination designed to emit light with the amount of light having the wavelength shorter than 430 nm smaller than the confirmed limit.

Further, light-bulb-shaped LED lamp 1 for illumination in accordance with the present embodiment hardly emits infrared rays. Therefore, unnecessary increase of the temperature in the poultry house can be prevented, and hence, skin irritation of chickens caused by infrared rays, temperature increase of the poultry house in summer and the problem of heat stress on the poultry can be prevented.

Preferable peak wavelength of light emitted from light-bulb-shaped LED lamp 1 for illumination is in the range of 580 to 620 nm. More preferable range is 590 to 610 nm. The light in such ranges exhibit the color of incandescent lamp, which promotes growth and fattening of chickens.

Use of a semiconductor light source enables emission of only the light having the peak wavelength in the specific range mentioned above. As a result, chickens are exposed to light having the wavelength effective in growth and fattening of chickens, so that meat and egg yield can be increased. Further, a semiconductor light source has high conversion efficiency from electricity to light. Specifically, the power consumption of light-bulb-shaped LED lamp 1 for illumination is as small as $1/10$ of an incandescent lamp. Therefore, when a semiconductor light source is used as a light source, power cost can be reduced, attaining high economic efficiency. Further, since the power consumption can be reduced, amount of $CO_2$ emission can be reduced.

Further, a semiconductor light source hardly generates heat. Therefore, it is possible to reduce the risk that a glass globe covering the semiconductor light source is shattered as it is cooled abruptly. Further, increase of the poultry house temperature caused by the light from the light source can be prevented. In addition, since a semiconductor light source has 40 times longer life than an incandescent lamp, it is economically more advantageous as regards the cost of exchange and the cost of bulbs. Further, because of the longer life, the number of exchanging the light source can be reduced, and hence the danger of glass shattered at the time of exchange and the danger involved in the exchanging work itself can be reduced. A semiconductor light source can be used at an electric field level not causing dielectric breakdown in high-moisture environment even if it is used with a common driving circuit and a common current lead-in wire, and hence, possibility of electric leakage is low and the possibility of fire caused thereby is also low.

Therefore, meat and egg yield can be increased, and safety and economic efficiency can be improved.

The light emitted from light-bulb-shaped LED lamp 1 for illumination is in the color temperature and chromatic coordinate ranges of an incandescent lamp. The color temperature range of incandescent lamp color is 2500 to 4000 K.

Figure 3:
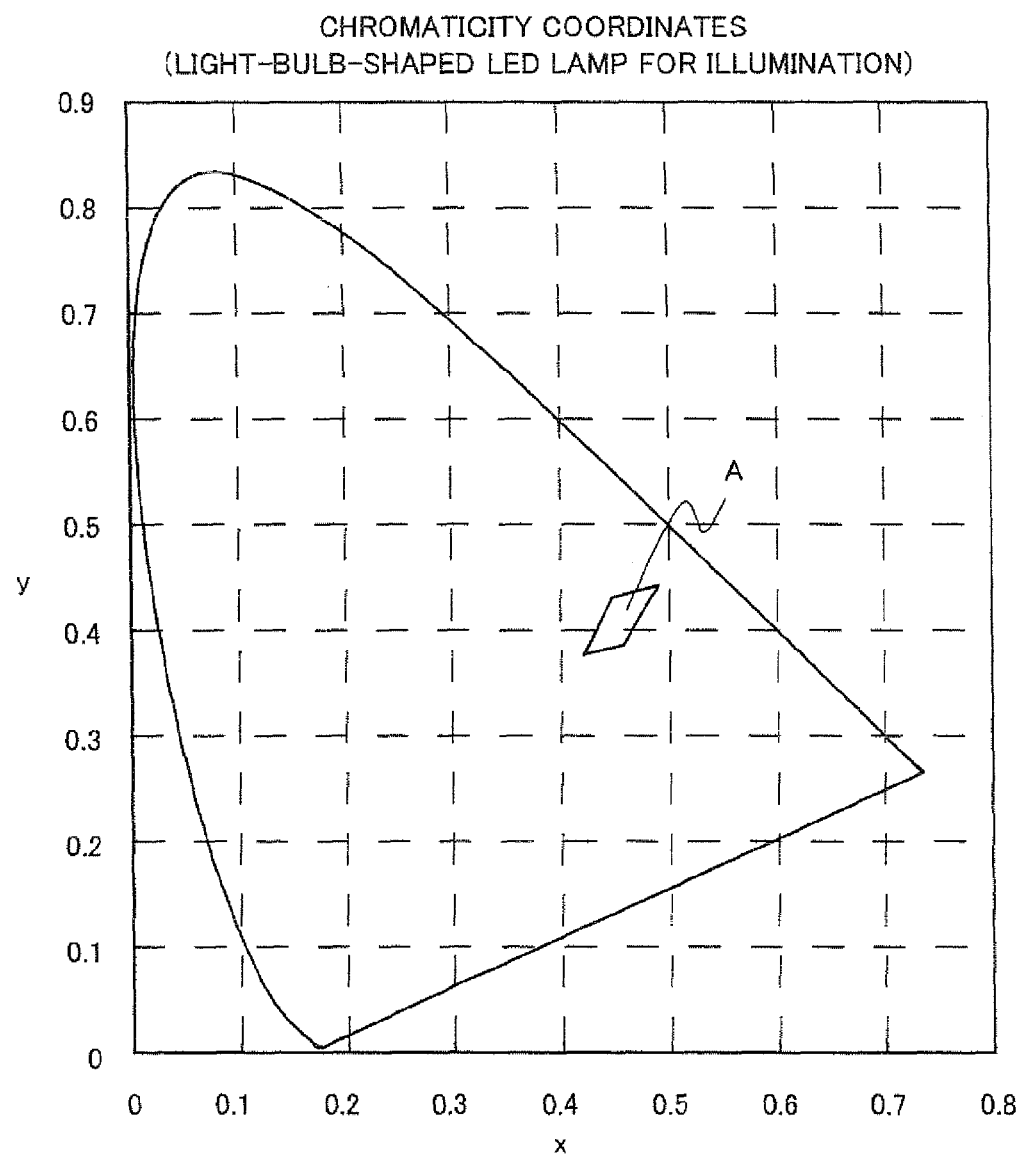
FIG. 3 is a chromaticity diagram showing the chromaticity coordinate range of incandescent lamp color.

FIG. 3 is a chromaticity diagram showing the chromaticity coordinate range of incandescent lamp color. Referring to FIG. 3, the range of chromaticity coordinates corresponding to the incandescent lamp is a range A in a rectangle having four points of (x, y)=(0.421, 0.377), (0.457, 0.386), (0.490, 0.442) and (0.447, 0.431) as vertexes.

Exposing chickens to light having the color of incandescent lamp promotes growth and fattening of chickens.

In the present embodiment, the semiconductor light source is assumed to be light-bulb-shaped LED lamp 1 for illumination including LED chips of incandescent lamp color. This is not limiting, and other semiconductor light source, such as a lamp including a laser diode, may be used.

In the present embodiment, since light-bulb-shaped LED lamps 1 for illumination are used, it becomes easier to design lighting of a large area with uniform brightness.

For use in a poultry house, light-bulb-shaped LED lamp 1 for illumination having drip-proof structure that hinders entrance of dust and water is adopted. It is a common practice in summer to spray water mist to decrease the temperature in the poultry house, and a large amount of high-pressure water is used for washing and sterilizing the poultry house. Therefore, light-bulb-shaped LED lamp 1 for illumination having drip-proof structure that hinders entrance of water is preferred. Use of a lamp having drip-proof and explosion-proof structure is more preferable.

By way of example, light-bulb-shaped LED lamps 1 for illumination are installed at an equal interval, for example, of 150 cm along the longitudinal direction of beam 5. Thus, the entire floor surface 7 of poultry house 10 can be irradiated with light from light-bulb-shaped LED lamps 1.

EXAMPLE 1

In the following, preferred examples of the present embodiment will be described. It is noted that the present embodiment is not limited to these examples.

In the present example, 15 broiler chickens per 1 $m^2$ were put as chickens 6, in poultry house 10 as described with reference to FIG. 1. In poultry house 10, light-bulb-shaped LED lamps 1 for illumination were installed with the number of 0.33 per 1 $m^2$. Light-bulb shaped LED lamps 1 for illumination used had the color temperature of 2800 K and CIE (Commission Internationale de l'Eclairage) chromatic coordinates of x=0.45 and y=0.41.

The number of broiler chickens is not limited to 15 per 1 $m^2$, and it may be changed depending on the size of broiler chickens as they grow. Further, the number of light-bulb-shaped LED lamps 1 for illumination is not limited to 0.33 per 1 $m^2$, and it may be changed depending on the position of installation (such as height) of light-bulb-shaped LED lamps 1 for illumination and on the output of light-bulb-shaped LED lamps 1 for illumination.

The height H of light-bulb-shaped LED lamps 1 for illumination was set to 200 cm vertically above floor surface 7 so that illuminance at 10 to 40 cm from the floor surface corresponding to the eye level of chickens 6 attained to 20 lx. The chickens 6 were reared in cage-free floor system. The used program is as shown in Table 1.

TABLE 1

| Age (days) | Illuminance (lx) | Illumination pattern |
| --- | --- | --- |
| 0-7 | 20 | 23 hours on/1 hour off |
| 7-out | 20-3 Gradually dimmed | 23 hours on/1 hour off |
| Shipment | 3-2 | |

For 0 to 7 days of age, the light was bright to have broiler chickens get accustomed to the poultry house. Specifically, the light was kept on for 23 hours with the illuminance set to 20 lx at the eye level of chickens 6, and turned off for 1 hour.

From 7 days of age to out, the illuminance at the eye level of chickens 6 while the light was on was gradually lowered from 20 lx to 3 lx using a dimmer. The light was kept on for 23 hours and off for 1 hour.

At the time of shipment, the illuminance at the eye level of chickens 6 was made dark, to 2 to 3 lx using the dimmer, to prevent chickens 6 from running wild.

Feeding facilities were provided to ensure all chickens could eat food equitably. A timer of the feeding facilities for feeding food and water was set such that food and water were fed simultaneously with turning on of light. Good quality food for chickens was fed ad libitum.

EXAMPLE 2

Figure 4:
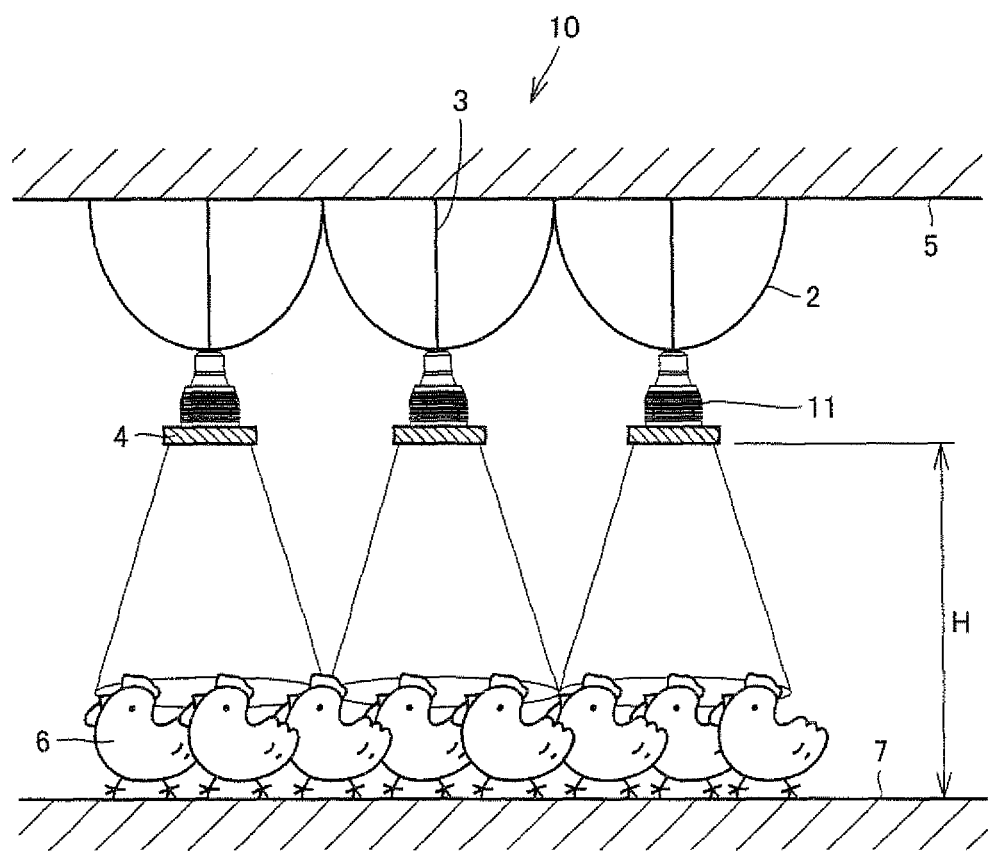
FIG. 4 is a schematic illustration of a poultry house of a second example of the present embodiment.

FIG. 4 is a schematic illustration of a poultry house of Example 2 of the present embodiment. Poultry house 10 of Example 2 has lighting facilities different from those of poultry house 10 described with reference to FIG. 1. Portions other than the lighting facilities are the same as those of poultry house 10 described with reference to FIG. 1 and, therefore, accumulative description will not be repeated.

Referring to FIG. 4, in Example 2, in place of light-bulb-shaped LED lamp 1 for illumination described with reference to FIG. 2A, a flat-shaped (type) light-bulb-shaped LED lamp 11 for illumination is used.

Figure 5:
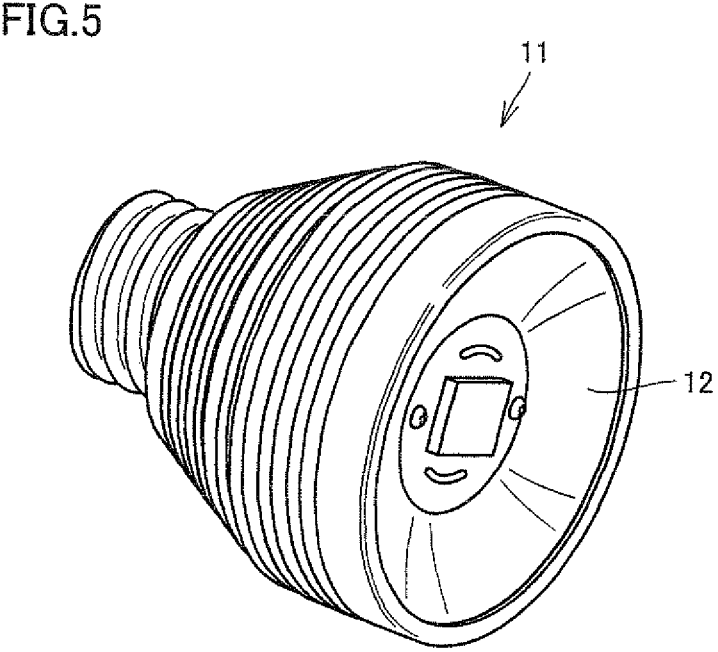
FIG. 5 shows an appearance of a flat-type, light-bulb-shaped LED lamp for illumination as a semiconductor light source installed in the poultry house of the second example.
Figure 6:
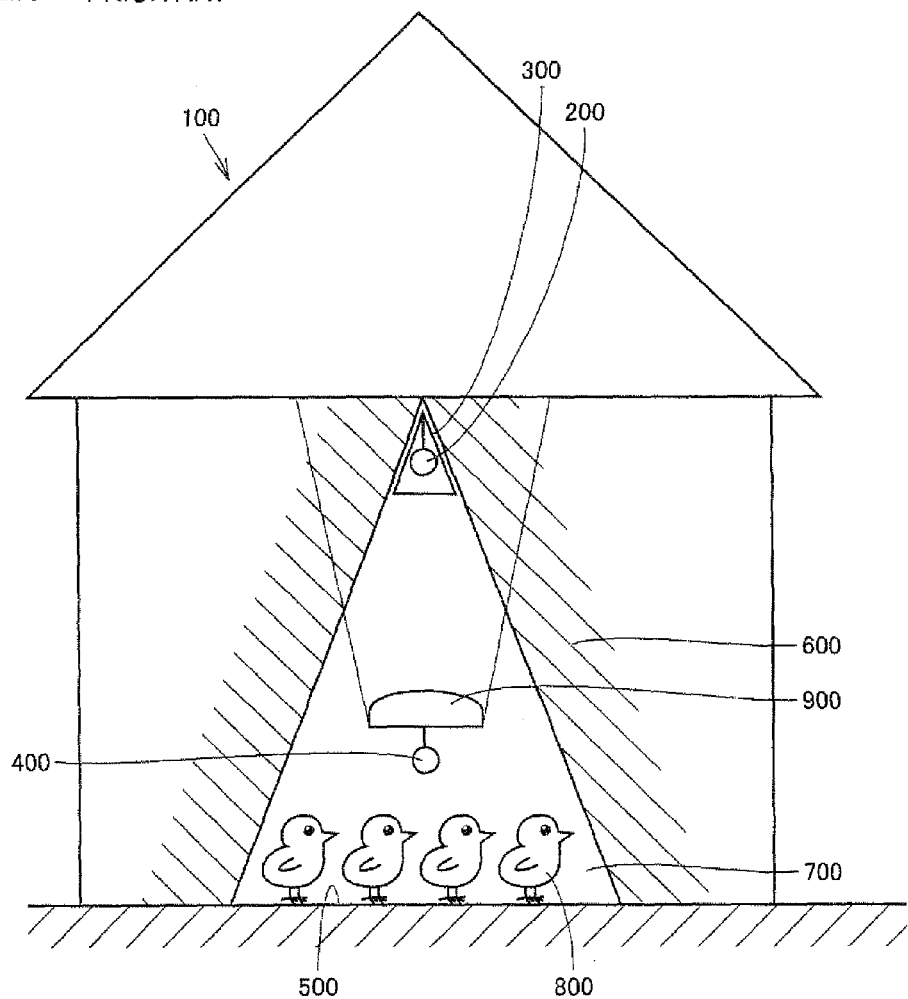
FIG. 6 is a schematic illustration of a conventional method of raising chicks using electric bulbs.

FIG. 5 shows an appearance of the shape of flat-type light-bulb-shaped LED lamp 11 for illumination as a semiconductor light source installed in poultry house 10 in Example 2, FIG. 2B also shows the appearance of the shape of flat-type light-bulb-shaped LED lamp 11 for illumination. Referring to FIG. 5, in flat-type light-bulb-shaped LED lamp 11 for illumination, a reflection film 12 is formed inside the globe. The flat-shaped (type) lamp can increase brightness to the lower direction. Further, it enables uniform illumination over a wide range.

Reflection film 12 here is formed by depositing silver. Any film that can reflect light emitted by LED to the tip end direction of the bulb may be used, and it may be formed by depositing aluminum.

Returning to FIG. 4, in Example 2, the lighting facilities further include a dimmer filter 4. Dimmer filter 4 is to continuously adjust illuminance of light emitted from flat-type light-bulb-shaped LED lamp 11 for illumination. Here, dimmer filter 4 capable of continuous illumination adjustment between 0% to 100% is used.

The lighting facilities also include a timer controller for time-controlling illumination adjustment by dimmer filter 4. The timer controller controls time period and illuminance of light emitted by the lighting facilities.

Though a filter for continuously adjusting the illuminance of light emitted from light-bulb-shaped LED lamp 11 for illumination as a semiconductor light source is used here, it is not limiting, and a filter capable of adjusting illuminance of light emitted from a semiconductor light source in a stepwise manner may be used. For example, a dimmer filter having filters for three-step adjustment of 10% attenuation, 30% and attenuation and 50% attenuation switchably arranged may be used.

In the present example, 15 broiler chickens per 1 m$^2$ were put as chickens 6, in poultry house 10. In poultry house 10, flat-type light-bulb-shaped LED lamps 11 for illumination were installed with the number of 0.33 per 1 m$^2$. Flat-type light-bulb shaped LED lamps 11 for illumination used had the color temperature of 2950 K and CIE chromatic coordinates of x=0.44 and y=0.41.

The height H of light-bulb-shaped LED lamps 11 for illumination was set to 150 cm vertically above floor surface 7 so that illuminance at the eye level of chickens 6 attained to 20 lx. The chickens 6 were reared in cage-free floor system. The used program is as shown in Table 2.

TABLE 2

| Age (days) | Illuminance (lx) | Illumination pattern |
| --- | --- | --- |
| 0-7 | 20 | 24 hours on |
| 7-out | 10-3 | 2 hours on/2 hours off or 1 hour on/3 hours off |
| Shipment | 3-2 | |

For 0 to 7 days of age, the light was bright to have broiler chickens get accustomed to the poultry house. Specifically, the light was kept on for 24 hours with the illuminance set to 20 lx at the eye level of chickens 6.

From 7 days of age to out, the illuminance at the eye level of chickens 6 was set to 10 to 3 lx using the dimmer filter. The light was turned on and of every 2 hours.

As to the method of repeating the bright period (light on) and the dark period (light off) in the period of 24 hours is not limited to turn the light on for 2 hours and of for 2 hours and, for example, the light may be turned on for 1 hour and off for 3 hours.

Further, when the light is turned from on to off, to mimic sunset, the illumination is reduced stepwise in 40 to 50 minutes in five steps, using the dimmer filter, from 10.0 lx→6.4 lx→4.8 lx→3.2 lx→off (darker than 0.4 lx).

After the light was kept off for 1 hour, when the light is turned from off to on, to mimic sunrise, the illumination is increased stepwise in 40 to 50 minutes in five steps, using the dimmer filter, from off→1.6 lx→3.2 lx→4.8 lx→6.4 lx→10 lx.

At the time of shipment, the illuminance at the eye level of chickens 6 was made dark, to 2 to 3 lx using the dimmer, to prevent chickens 6 from running wild.

Feeding facilities were provided to ensure all chickens could eat food equitably. A timer of the feeding facilities for feeding food and water was set such that food and water were fed simultaneously with turning on of light. Good quality food for chickens was fed ad libitum.

The intermittent lighting method and use of light-bulb-shaped LED lamp 11 for illumination with small heat generation were very effective to reduce heat stress on chickens 6.

Further, by adopting the on-and-off lighting by which the bright period was made long at the initial stage of growth and the dark period was made gradually longer after the middle to late stages of growth, growth, feed requirement and rate of maturity could be improved as compared with the system of 24-hours lighting using incandescent lamps.

Further, since the illuminance is adjusted to be gradually increased, it becomes possible to prevent chickens 6 from rushing to feeders of food and water at one time. Hence, quick eating can be prevented. Further, since the illuminance is adjusted to be gradually decreased, chickens try to eat much food before it gets dark and, therefore, it is possible to urge chickens 6 to eat large amount of food. This allows chickens 6 to eat adequately to full stomach.

If it is too dark for people to work, illuminance may be increased only during work. In that case, preferable illuminance is 20 to 30 lx.

The embodiments as have been described here are mere examples and should not be interpreted as restrictive. The scope of the present embodiments are determined by each of the claims with appropriate consideration of the written description of the embodiments and embraces modifications within the meaning of, and equivalent to, the languages in the claims.

The invention claimed is:

1. A poultry raising system including a poultry house and facilities attached to said poultry house, wherein
said facilities include lighting facilities for irradiating poultry with light; and
said lighting facilities include a semiconductor light source, for irradiation with light having peak wavelength in the range of 550 to 650 nm emitted from the semiconductor light source, wherein
the light emitted from said lighting facilities attains illuminance of 1 to 30 lux at the eye level of said poultry, wherein
said lighting facilities are attached to said poultry house and they include a height adjusting mechanism such that a height of said semiconductor light source can be adjusted and the emitted light attains illuminance in the range of 1 to 30 lux at the eye level of said poultry.

2. The poultry raising system according to claim 1, wherein said lighting facilities further include an illuminance adjusting mechanism capable of continuous or stepwise adjustment of illuminance of emitted light, from the highest illuminance in the range of 1 to 30 lux at the eye level of said poultry to illuminance at the time of power off.

3. The poultry raising system according to claim 1, wherein said lighting facilities further include a swing reducing mechanism for reducing swing of said semiconductor light source.

4. The poultry raising system according to claim 3, wherein said height adjusting mechanism is a fixing rope suspending the semiconductor light source from an anchor point where said semiconductor light source is mounted on said poultry house, allowing adjustment of length between said semiconductor light source and said anchor point; and said swing reducing mechanism is an auxiliary rope capable of limiting amplitude of pendulum motion of said semiconductor light source suspended from said anchor point.

5. The poultry raising system according to claim 1, wherein the light emitted from said lighting facilities is in a color temperature range of incandescent lamp color.

6. The poultry raising system according to claim 1, wherein the light emitted from said lighting facilities is in a chromaticity coordinate range of incandescent lamp color.

7. The poultry raising system according to claim 1, wherein said poultry house is a windowless poultry house.

8. The poultry raising system according to claim 1, wherein said semiconductor light source includes a light emitting diode or a laser diode.

9. The poultry raising system according to claim 1, wherein said semiconductor light source is a light-bulb-shaped LED lamp for illumination.

10. The poultry raising system according to claim 1, wherein said poultry includes chickens.

11. A method of raising poultry in a poultry raising system including a poultry house and facilities attached to said poultry house, wherein lighting facilities included in said attached facilities for irradiating poultry with light include a semiconductor light source emitting light having peak wavelength in the range of 550 to 650 nm, wherein the light emitted from said lighting facilities attains illuminance of 1 to 30 lux at the eye level of said poultry, wherein said lighting facilities are attached to said poultry house and they include a height adjusting mechanism such that a height of said semiconductor light source can be adjusted and the emitted light attains illuminance in the range of 1 to 30 lux at the eye level of said poultry.

12. The method of raising poultry according to claim 11, wherein said lighting facilities adjust continuously or stepwise illuminance of emitted light from the highest illuminance in the range of 1 to 30 lux at the eye level of said poultry to illuminance at the time of power off.

13. The method of raising poultry according to claim 11, wherein said semiconductor light source includes a light emitting diode or a laser diode.

14. The method of raising poultry according to claim 11, wherein said semiconductor light source is a light-bulb-shaped LED lamp for illumination.

15. The method of raising poultry according to claim 11, wherein said poultry includes chickens.

16. A luminescent device for raising poultry, comprising a semiconductor light source having peak wavelength in a range of 550 to 650 nm, wherein the light emitted from said semiconductor light source attains illuminance of 1 to 30 lux at the eye level of said poultry, wherein said luminescent device is attached to said poultry house and it includes a height adjusting mechanism such that a height of said semiconductor light source can be adjusted and the emitted light attains illuminance in the range of 1 to 30 lux at the eye level of said poultry.

17. The luminescent device for raising poultry according to claim 16, wherein the light emitted from said semiconductor light source is in a color temperature range of incandescent lamp color.

18. The luminescent device for raising poultry according to claim 16, wherein the light emitted from said semiconductor light source is in a chromaticity coordinate range of incandescent lamp color.

19. The luminescent device for raising poultry according to claim 16, wherein said semiconductor light source includes a light emitting diode or a laser diode.

* * * * *